(12) United States Patent
Cook et al.

(10) Patent No.: US 12,083,984 B2
(45) Date of Patent: Sep. 10, 2024

(54) AIRBAG ASSEMBLY FOR A VEHICLE

(71) Applicant: NISSAN NORTH AMERICA, INC., Franklin, TN (US)

(72) Inventors: Austin Cook, Howell, MI (US); Brian Downey, Westland, MI (US)

(73) Assignee: Nissan North America, Inc., Franklin, TN (US)

( * ) Notice: Subject to any disclaimer, the term of this patent is extended or adjusted under 35 U.S.C. 154(b) by 0 days.

(21) Appl. No.: 17/899,487

(22) Filed: Aug. 30, 2022

(65) Prior Publication Data

US 2024/0067120 A1 Feb. 29, 2024

(51) Int. Cl.
  *B60R 21/2342* (2011.01)
  *B60R 21/201* (2011.01)
  *B60R 21/2165* (2011.01)

(52) U.S. Cl.
  CPC ........ *B60R 21/2342* (2013.01); *B60R 21/201* (2013.01); *B60R 21/2165* (2013.01)

(58) Field of Classification Search
  CPC .............. B60R 21/2342; B60R 21/201; B60R 21/2165
  See application file for complete search history.

(56) References Cited

U.S. PATENT DOCUMENTS

| | | | |
|---|---|---|---|
| 7,478,826 B2 | 1/2009 | Soderquist et al. | |
| 11,472,365 B1 * | 10/2022 | Yaney | B60R 21/215 |
| 2003/0189319 A1 | 10/2003 | Soderquist | |
| 2009/0152842 A1 * | 6/2009 | Benny | B60R 21/201 |
| | | | 280/728.3 |
| 2011/0121548 A1 | 5/2011 | Maripudi et al. | |
| 2016/0332591 A1 * | 11/2016 | Schwark | B60R 21/2165 |
| 2021/0009073 A1 * | 1/2021 | Swiniarski | B60R 21/217 |

* cited by examiner

*Primary Examiner* — Jason D Shanske
*Assistant Examiner* — Matthew James O'Neill
(74) *Attorney, Agent, or Firm* — Global IP Counselors, LLP

(57) ABSTRACT

An airbag assembly for a vehicle includes a housing, an airbag, and a flap. The airbag is stored in the housing. The flap is secured to the housing and is configured to retain the airbag in a stored state. The flap has a tear seam at which the flap is configured to separate upon deployment of the airbag. The tear seam extends non-linearly from a first lateral edge to a second lateral edge.

18 Claims, 10 Drawing Sheets

AIRBAG ASSEMBLY FOR A VEHICLE

BACKGROUND

Technical Field

The present disclosure generally relates to an airbag assembly for a vehicle. More specifically, the present disclosure relates to a tear seam for a flap retaining an airbag of an airbag assembly in a vehicle.

Background Information

Airbag assemblies are installed at various locations within a vehicle, such as in the instrument panel, or dashboard, of the vehicle. A flap retains an airbag of the airbag assembly in a stored state at the installation location.

SUMMARY

A need exists for a flap that retains an airbag of an airbag assembly in a stored state.

In view of the state of the known technology, one aspect of the present disclosure is to provide an airbag assembly for a vehicle including a housing, an airbag, and a flap. The airbag is stored in the housing. The flap is secured to the housing and is configured to retain the airbag in a stored state. The flap has a tear seam at which the flap is configured to separate upon deployment of the airbag. The tear seam extends non-linearly from a first lateral edge to a second lateral edge.

Another aspect of the present disclosure is to provide an airbag assembly for a vehicle. The vehicle includes an instrument panel disposed forward of a front passenger seat. A recess is formed in the instrument panel. A housing is configured to be received in the recess in the instrument panel. An inflator is connected to the housing. An airbag is stored in the housing and is in communication with the inflator. A flap is secured to the housing and is configured to retain the airbag in a stored state. The flap has a tear seam at which the flap is configured to separate upon deployment of the airbag. The tear seam extends non-linearly from a first lateral edge to a second lateral edge.

Also other objects, features, aspects and advantages of the disclosed airbag assembly for a vehicle will become apparent to those skilled in the art from the following detailed description, which, taken in conjunction with the annexed drawings, discloses exemplary embodiments of the airbag assembly for a vehicle.

BRIEF DESCRIPTION OF THE DRAWINGS

Referring now to the attached drawings which form a part of this original disclosure.

DETAILED DESCRIPTION OF EXEMPLARY EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Referring initially to FIGS. 1-10, an airbag assembly 10 of a vehicle 12 is illustrated in accordance with an exemplary embodiment. The airbag assembly 10 is disposed in an instrument panel, or dashboard, 14, of the vehicle 12.

Figure 1:
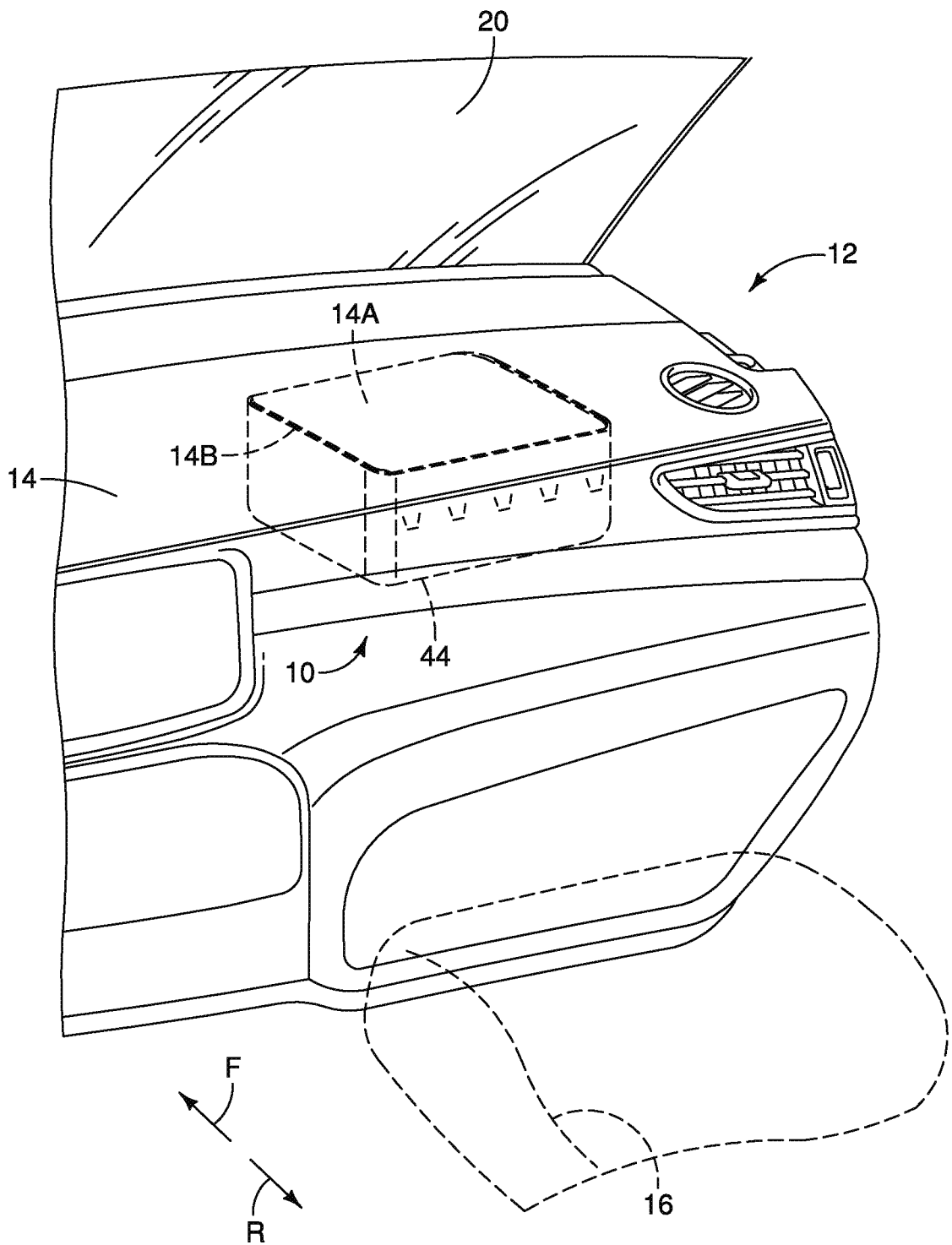
FIG. 1 is a perspective view of an airbag assembly in accordance with an exemplary embodiment disposed in an instrument panel of a vehicle.
Figure 2:
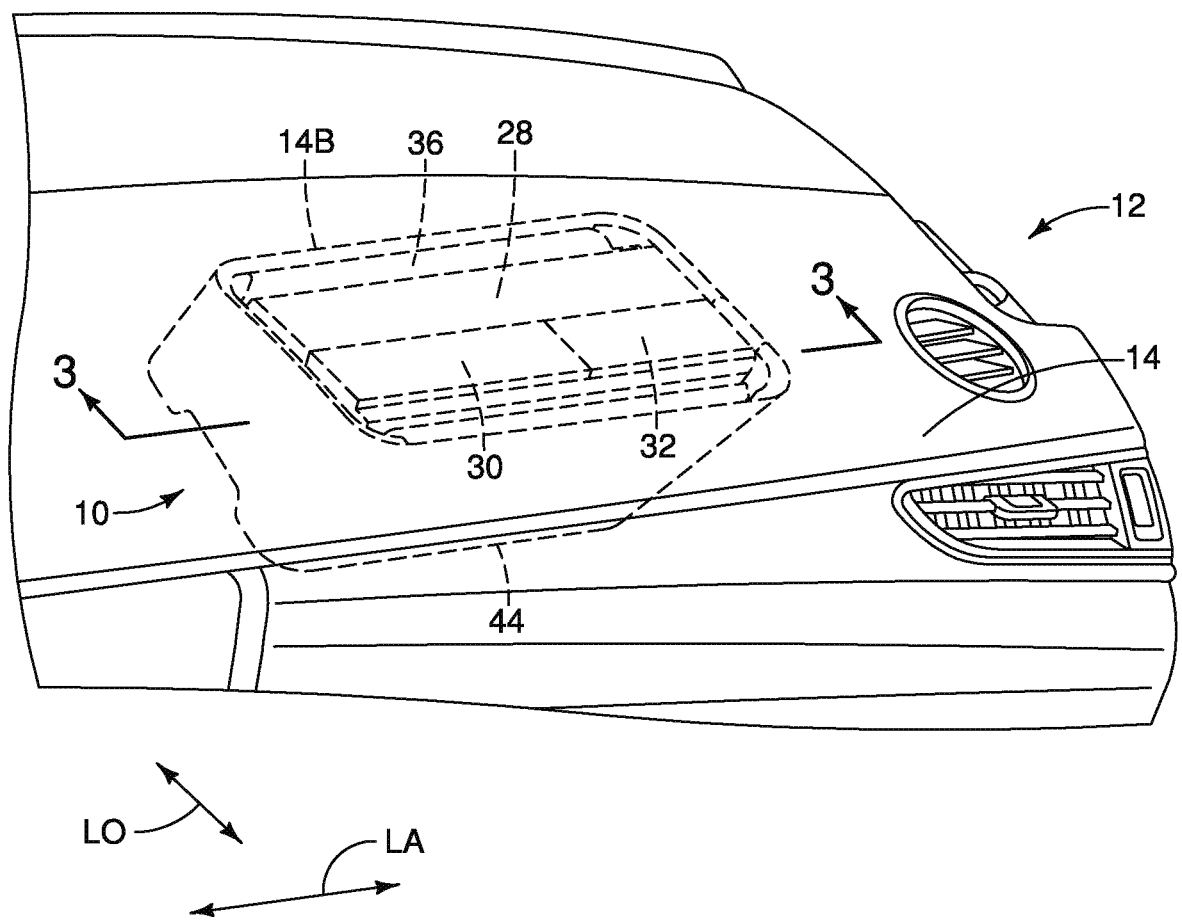
FIG. 2 is a perspective view of the instrument panel of FIG. 1 in which a plurality of pivotable doors are illustrated.
Figure 3:
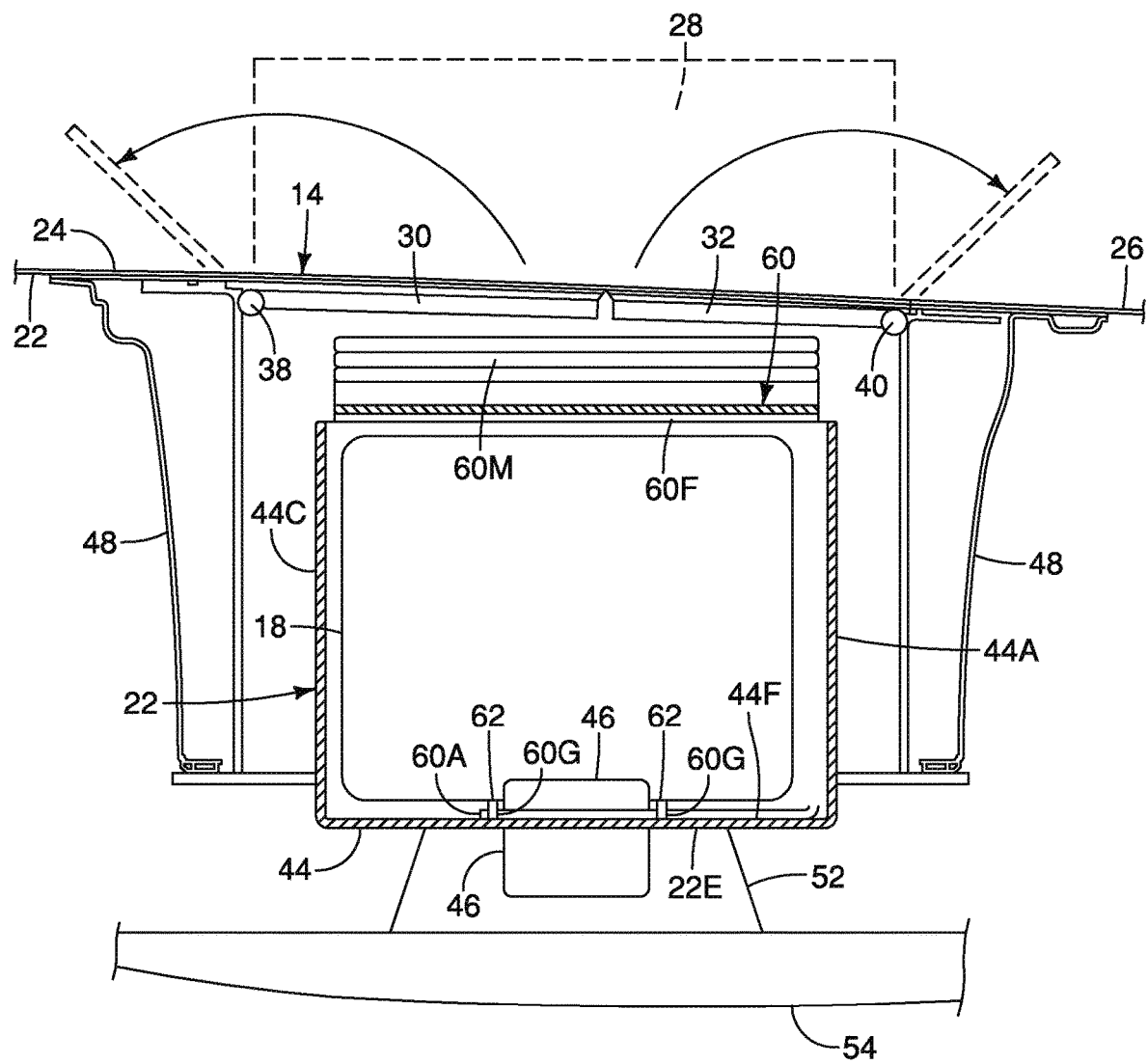
FIG. 3 is an elevational view in cross section of the instrumental panel taken along line 4-4 of FIG. 2.

The instrument panel 14 includes conventional vehicle gauges and controls (not shown) forward of a vehicle operator's seat (not shown), as shown in FIGS. 1-3. The instrument panel 14 also includes a separation portion 14A forward of a passenger's front seat 16. The airbag assembly 10 is disposed in the separation portion 14A of the instrument panel 14 disposed forward of the passenger front seat 16. The separation portion 14A of the instrument panel 14 is configured to separate from the instrument panel 14 upon deployment of an airbag 18 (FIGS. 6-8) of the airbag assembly 10.

Figure 6:
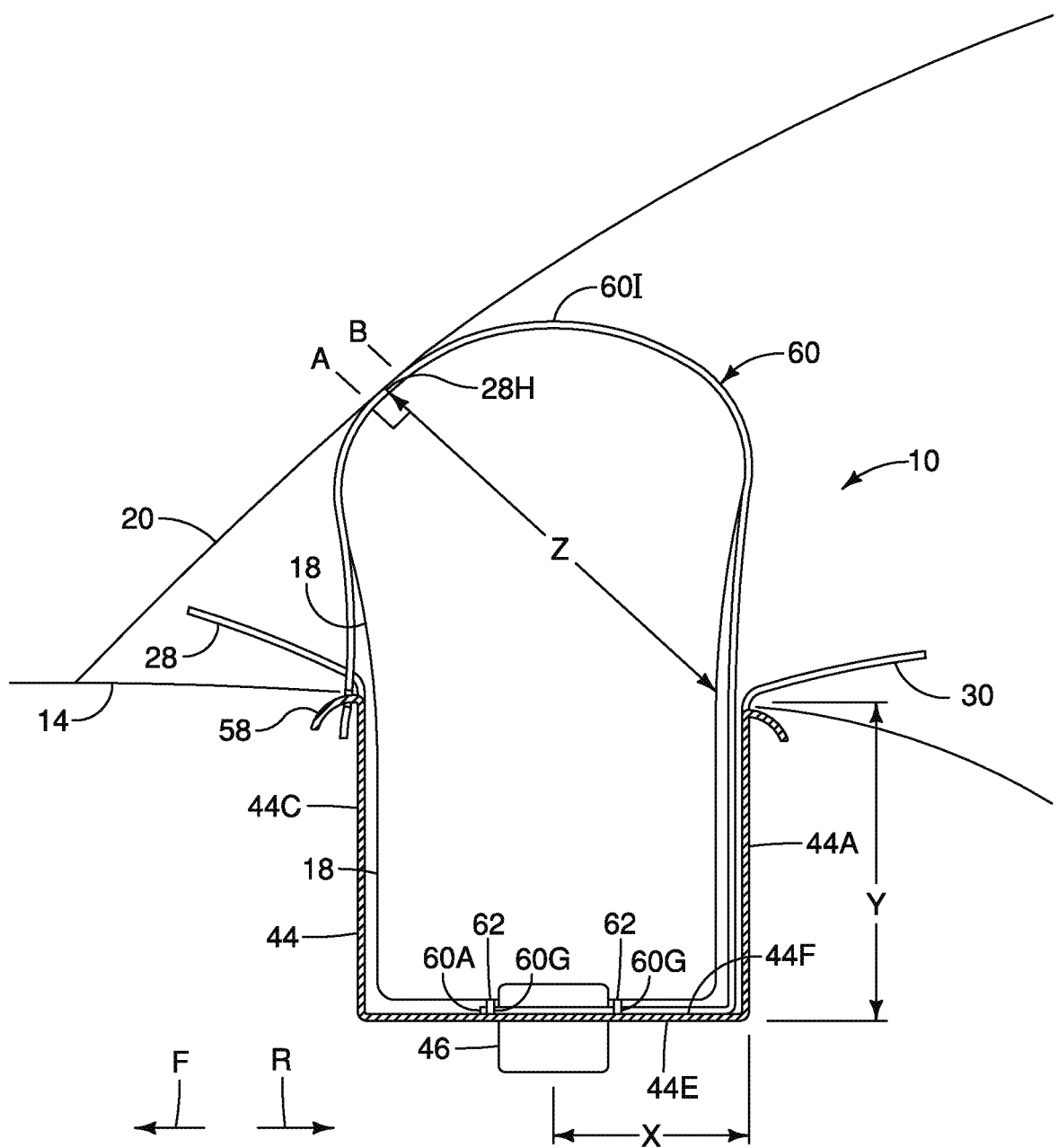
FIG. 6 is an elevational view in cross section of the airbag assembly of FIG. 1 during deployment of an airbag prior to separation of a retaining flap.
Figure 7:
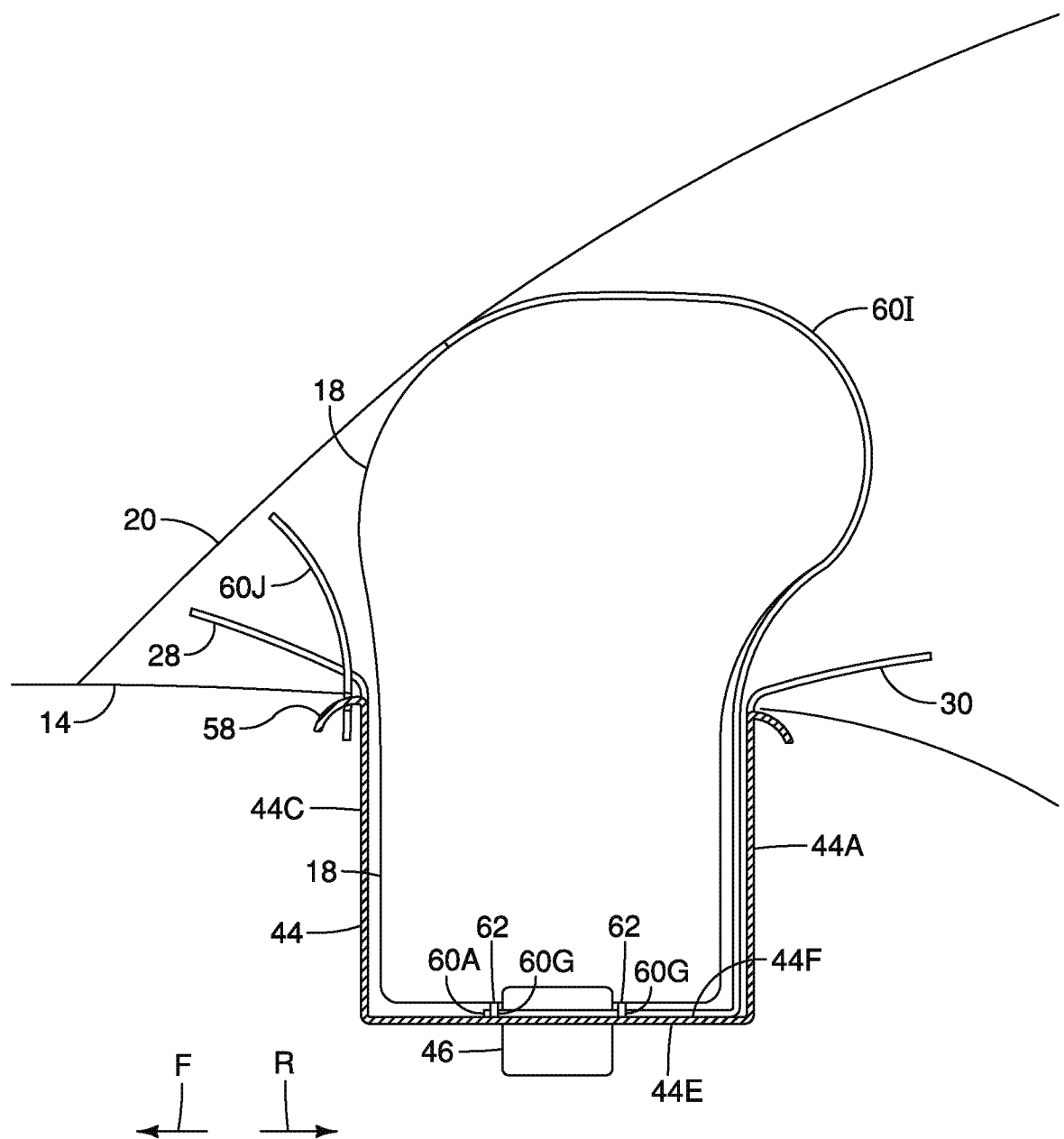
FIG. 7 is an elevational view in cross section of the airbag assembly of FIG. 6 during deployment of the airbag after separation of the retaining flap.
Figure 8:
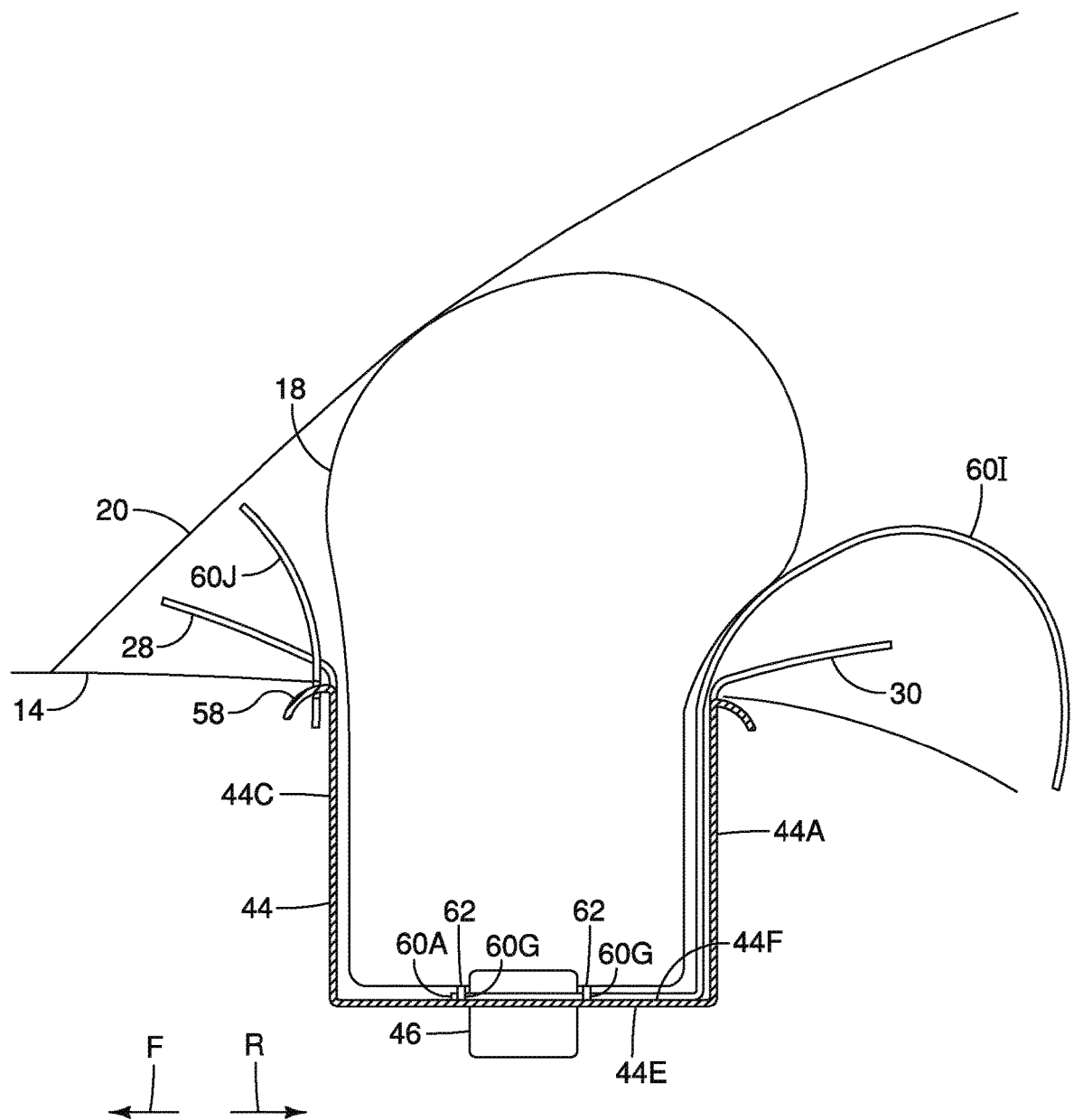
FIG. 8 an elevational view in cross section of the airbag assembly of FIG. 7 after further deployment of the airbag.

The separation portion 14A of the instrument panel 14 defines an opening in the upper surface of the instrument panel 14 disposed between the passenger front seat 16 and a windshield 20 of the vehicle 12 in a longitudinal direction of the vehicle 12 through which the airbag 18 is configured to be deployed, as shown in FIGS. 1-3. The separation portion 14A includes a separation line 14B configured to facilitate separation of the separation portion 14A from the instrument panel 14 during deployment of the airbag 18 (FIGS. 6-8).

The instrument panel 14 is multilayered, as shown in FIG. 3. Specifically, the instrument panel 14 includes a backing panel 22, a foam layer 24 and a skin 26. The backing panel 22 is shaped and dimensioned to define the overall design of the instrument panel 14. The foam layer 24 overlays the backing panel 22 and provides the instrument panel 14 with a soft feel with some cushioning provided by the foam layer 24. The foam layer 24 is compressible with the skin 26 overlaying the foam layer 24. The skin 26 includes a decorative look that can include a textured leather appearance and feel, a textile feel, or other appearance and feel to the touch. The skin 26 can be a layer of leather or faux leather. The backing panel 22 defines a lower surface of the instrument panel 14 and the skin 26 defines an upper surface of the instrument panel 14. The separation line 14B can have any suitable shape to facilitate separation of the separation portion 14A from the instrument panel 14.

The opening in the instrument panel 14 defined by the separation portion 14A is at least partially covered by a first door 28, a second door 30 and a third door 32. The first door 28, the second door 30 and the third door 32 are hingedly connected to brackets 34, as shown in FIGS. 2 and 3. The brackets 34 are connected to the instrument panel 14 in a conventional manner, such as by welding, with an adhesive, and/or by mechanical fasteners.

The first door 28 pivots about a laterally extending hinge 36, and the second and third doors 28 and 30 pivot about longitudinally extending hinges 38 and 40, as shown in FIGS. 2 and 3. The laterally extending hinge 36 pivots about an axis extending in a lateral direction LA of the vehicle 12. The longitudinally extending hinges 38 and 40 extend about an axis extending in a longitudinal direction LO of the vehicle 12. The first, second and third doors 26, 28 and 30 are configured to pivot about the hinges 36, 38 and 40, respectively, to open positions upon deployment of the airbag 18.

Figure 4:
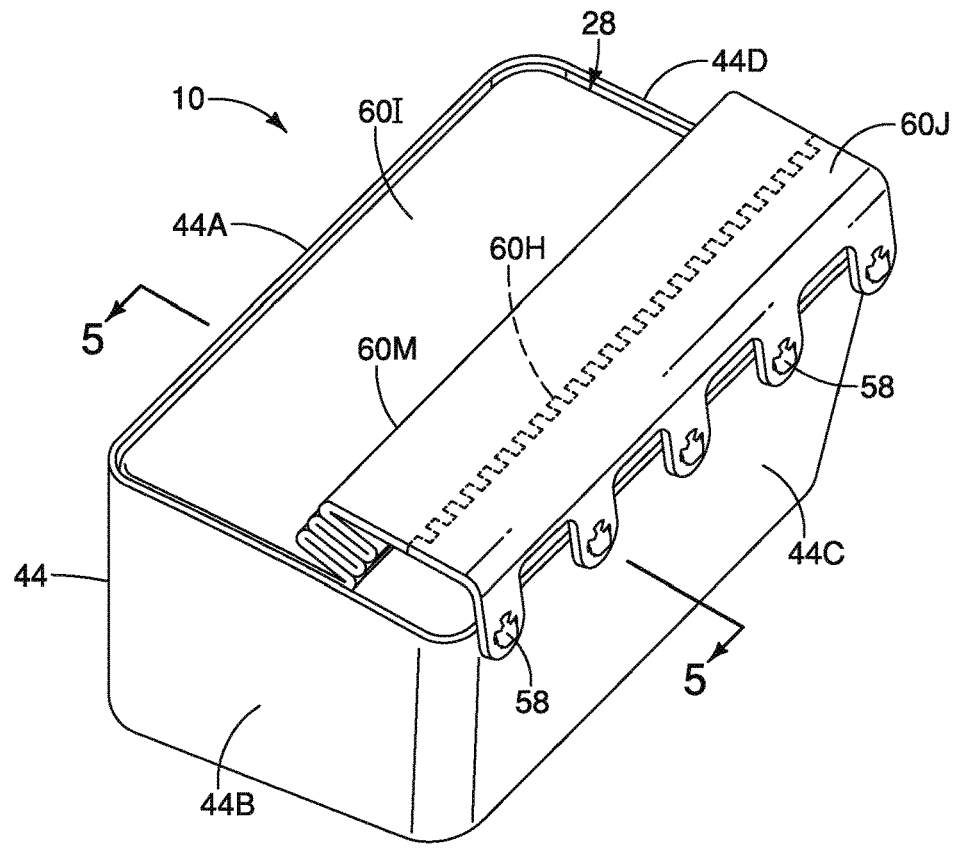
FIG. 4 is a perspective view of the airbag assembly of FIG. 1 prior to installation in the vehicle.
Figure 5:
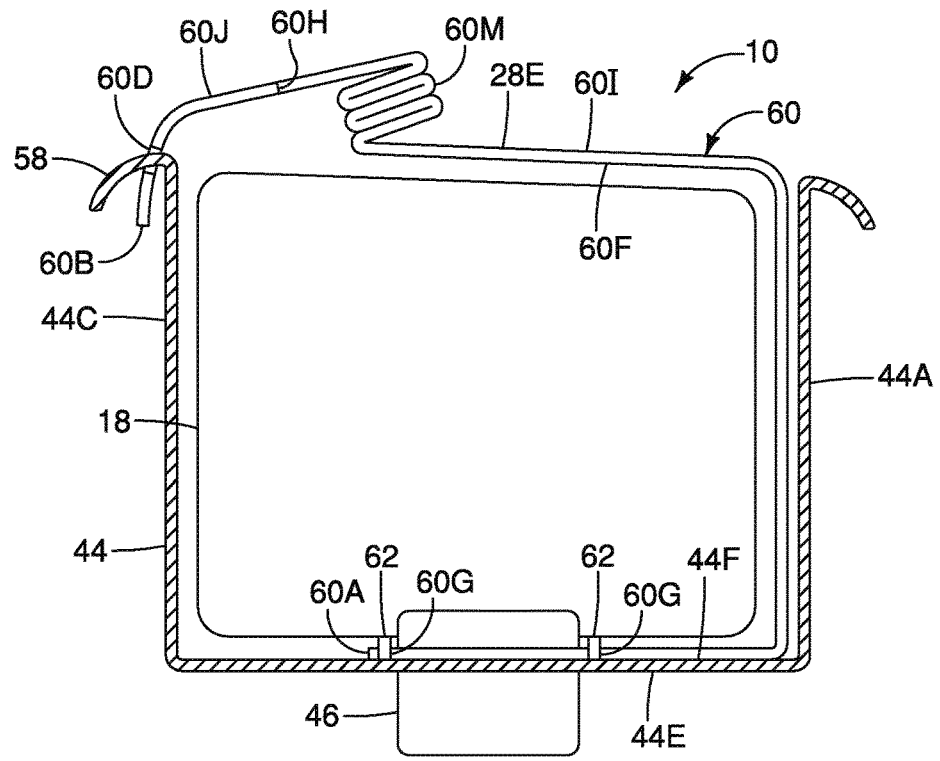
FIG. 5 is an elevational view in cross section of the airbag assembly of FIG. 4 prior to installation in the vehicle.

The airbag assembly 10 includes an airbag 18 stored in an airbag housing 44, as shown in FIGS. 3-5. The housing 44 is disposed in a recess formed in the instrument panel 14, as shown in FIGS. 1-3. The housing 44 includes a plurality of walls 44A-44D extending upwardly from a base 44E. An opening (not shown) disposed in the base 44E of the housing is configured to receive an inflator 46. The airbag 18 stored in the housing 44 is in communication with the inflator 46. The housing 44 can be any suitable size, such as substantially rectangular, configured to store the airbag 18 in an undeployed state. Each of the walls 44A-44D extends upwardly along an outer edge of the base 44E. Each of the walls 44A-44D is substantially perpendicular to adjacent walls, such as wall 44A being substantially perpendicular to adjacent walls 44B and 44D and to the base 44E.

The housing 44 is connected to flanges 48 of the instrument panel 14, as shown in FIG. 3. The flanges 48 are connected to a flange 50 extending outwardly from the walls 44A-44D of the housing 44. Alternatively, the flanges 48 can be connected directly to the walls 44A-44D of the housing 44.

A bracket 52 secures the housing 44 to a support member 56, such as a steering member, as shown in FIG. 3, to further support the airbag assembly 10. The steering member is a rigid member extending in a lateral direction of the vehicle.

A plurality of hooks 58 are disposed on outer surfaces of the wall 44C, as shown in FIGS. 4 and 5. The forward wall 44C faces a forward direction of the vehicle 12, as shown in FIG. 6. Although shown with five hooks 32 on the forward wall 44C in FIG. 4, the housing 44 can include any suitable number of hooks 58. Although shown with hooks 58 on the forward wall 44C, the hooks 58 can be disposed on outer surface of any of the walls 44A-44D, such as on an outer surface of the rearward facing wall 44A, as shown in FIG. 6.

A retaining flap 60 is secured to the housing 44, as shown in FIGS. 4-6. The flap 60 is configured to retain the airbag 18 in the housing 44 in a stored, or undeployed, state. The flap 60 has a first end 60A and a second end 60B. An opening 60C is disposed proximal the first end 60A and is configured to receive the inflator 46. A plurality of slits, or cuts, 60D are disposed in the flap 60 proximal the second end 60B of the flap 60. Each of the plurality of slits 60D extends completely through the flap 60 from an upper surface 60E to a lower surface 60F. The flap 60 can be made of any suitable material, such as a nylon fabric.

Figure 9:
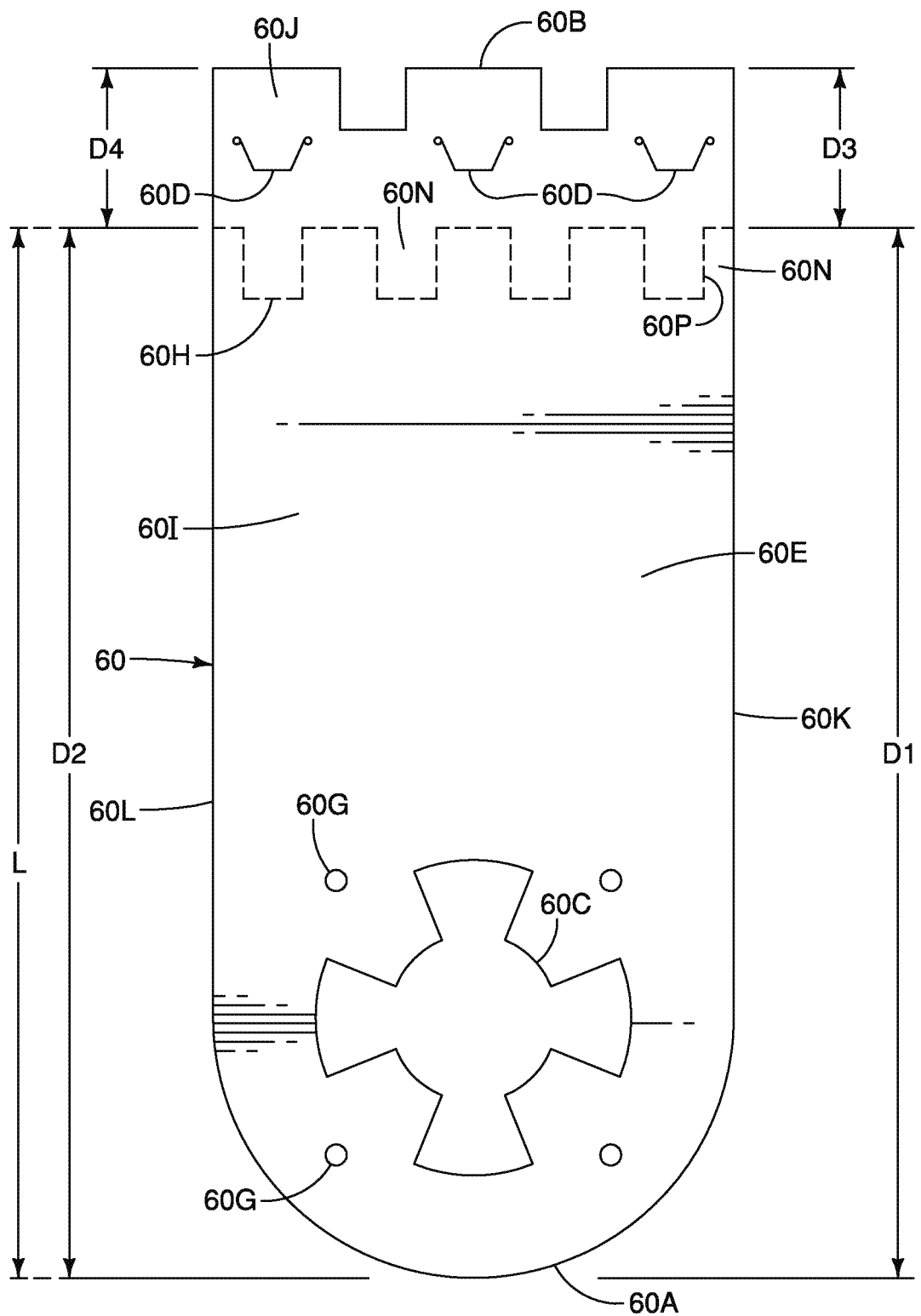
FIG. 9 is a top plan view of the retaining flap of the airbag assembly of FIGS. 2-6.

A plurality of fastener holes 60G disposed around the opening 60C are configured to receive fasteners 62 to secure the flap 60 to the housing 44. The plurality of fastener holes 60G are configured to receive fasteners 62 to secure the flap to an inner surface of the base 44E of the housing 44. As shown in FIG. 9, four fastener holes 60G are disposed around the opening 60C, although the flap 60 can have any suitable number of fastener holes. The fastener holes 60G are preferably substantially equally spaced in a radial direction from a center of the opening 60C.

A tear seam 60H defines a first portion 60I and a second portion 60J of the retaining flap 60, as shown in FIG. 9. The flap 60 is configured to separate at the tear seam 60H upon deployment of the airbag 18, as shown in FIGS. 6-8. The tear seam 60H extends non-linearly from a first lateral edge 60K to a second lateral edge 60L. The entirety of the tear seam 60H is not perpendicular to the first and second lateral edges 60K and 60L of the flap 60. The tear seam can be formed in any suitable manner, such as being perforated or having bridge portions extending between the first and second portions 60I and 60J of the flap 60.

A first distance D1 from a first point on the tear seam 60H on the first lateral edge 60K from the first end 60A of the flap 60 is substantially equivalent to a second distance D2 from a second point on the tear seam 60H on the second lateral edge 60L from the first end 60A of the flap 60. Preferably, the first and second distances D1 and D2 are substantially equal. A third distance D3 from the first point on the tear seam 60H on the first lateral edge 60K from the second end 60B of the flap 60 is substantially equivalent to a fourth distance D4 from the second point on the tear seam 60H on the second lateral edge 60L from the second end 60B of the flap 60. Preferably, the third and fourth distances D3 and D4 are substantially equal. At least one point on the tear seam 60H is disposed at a distance either greater than or less than the first and second distances D1 and D2. At least one point on the tear seam 60H is disposed at a distance either greater than or less than the first and second distances D3 and D4.

The flap 60 extends across an upper surface 18A of the airbag 18 in the stored state, as shown in FIGS. 4 and 5. The first end 60A of the flap 60 is configured to be connected to an inner surface 44F of the housing 44. The opening 60C in the flap 60 is configured to receive the inflator 46. The opening 60C is disposed in the first portion 60I of the flap 60. The second end 60B of the flap 60 is configured to be connected to an outer, or external, surface of the housing 44. At least one hook 58 is disposed on an outer surface of the housing 44. Preferably, a plurality of hooks 58 are disposed on the outer surface of the housing 44. Each of the slits 60D in the flap 60 is configured to engage one of the plurality of hooks 58, thereby securing the second end 60B of the flap 60 to the housing 44 and retaining the airbag 18 in the housing 44 in the stored state, as shown in FIGS. 4 and 5. The at least one slit 60D is disposed in the second portion 60J of the flap 60.

The retaining flap 60 includes an accordion portion, or fold, 60M, as shown in FIGS. 4 and 5, disposed between the first end 60A and the second end 60B of the flap 60. The accordion fold 60M is preferably disposed in the first portion 60I of the flap 60. The tear seam 60H in the flap 60 is preferably disposed between the accordion portion 60M and the second end 60B of the flap 60. The accordion portion 60M allows a longer flap 60 to be secured to the housing 66 that accommodates an initial expansion of the airbag 18 upon deployment.

The tear seam 60H defines the first portion 60I on a first side of the tear seam 60H and the second portion 60J on a second side of the tear seam 60H, as shown in FIGS. 4, 5, 9 and 10. The tear seam 60H is preferably a castle cut forming a plurality of rectangular portions 60N in the first and second portions 60I and 60J of the flap 60. The tear seam 60H can be any suitable configuration such that the entirety of the tear seam 60H is not equidistant from either of the first and second ends 60A and 60B of the flap 60.

The tear seam 60H is disposed at a length L from the first end 60A of the flap 60, as shown in FIG. 9. The length L is the sum of a length X plus a length Y plus a length Z, as shown in FIG. 6. The length X is a length from a center of the inflator 46, or the center of the inflator opening in the housing 44, to a rear edge of the base 44E of the housing 44. The length Y is a length from the rear edge of the base 44E of the housing 44 to an upper surface of the instrument panel 14 on the rear side of the housing 44. The length Z is a length from the upper surface of the instrument panel 14 to the windshield 20 in which the length Z is substantially perpendicular to the windshield 20.

As shown in FIG. 6, the airbag 18 is configured to have a contact range with the windshield between points A and B. The tear seam 60H is preferably disposed between points A and B or rearward thereof when the flap 60 is pushed outwardly by the expanding airbag 18. More preferably, the tear seam 60H is disposed between points A and B of the flap 60, as shown in FIG. 10.

Figure 10:
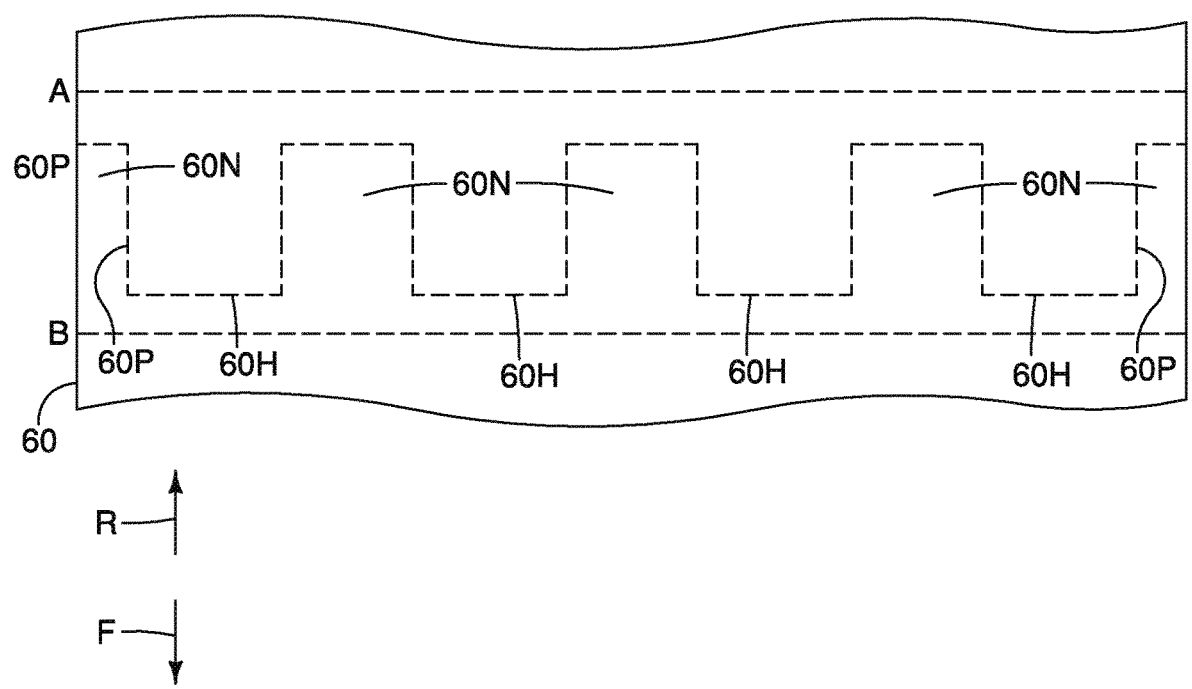
FIG. 10 is an enlarged top plan view of the tear seam of the retaining flap of FIG. 9.

The first non-linear portion 60P of the tear seam 60H extends toward the second end 60B of the flap 60, as shown in FIGS. 9 and 10. In other words, the first non-linear portions 60P of the tear seam tear seam adjacent the lateral edges 60K and 60L extend towards the second end 60B of the flap 60. In other words, the first rectangular portions 60N are disposed on the first portion 60I of the flap 60.

Responsive to deployment of the airbag assembly 10, the airbag 18 is inflated by the inflator 46 in a conventional manner. As the airbag 18 inflates, the airbag 18 fills the space beneath the first, second and third doors 28, 30 and 32. The force generated by the inflation of the airbag 18, presses against the first, second and third doors 28, 30 and 32. As the airbag 18 continues to inflate 18, the force generated by the inflation of the airbag 18 pivots the first, second and third doors 28, 30 and 32 upwardly, as shown in FIGS. 6-8, causing separation of the separation portion 14A from the instrument panel 14. The airbag 18 rapidly expands in milliseconds to a fully inflated and deployed state, as shown in FIGS. 6-8.

The inflated airbag 18 contacts the windshield 18, as shown in FIGS. 6-8. The retaining flap 60 is pushed outwardly from the housing 44 by the inflation of the airbag 18. The first end 60A of the flap 60 is secured to the base 44E of the housing 44 by the fasteners 62. The second end 60B of the flap 60 is secured to the hooks 58 on the outer surface of the forward wall 44C of the housing 44. As shown in FIGS. 6 and 10, the flap 60 is configured to have a contact area with the windshield between points A and B. The tear seam 60H of the flap 60 is preferably disposed in the contact area of the flap 60 between points A and B. The retaining flap 60 is configured to separate at the tear seam 60H when the airbag 18 is fully inflated. The non-linear shape of the tear seam 60H reduces the contact area of the first portion 60I of the flap 60 at the time of separation of the flap 60. As shown in FIG. 8, the first portion 60I of the flap 60 is moved rearwardly toward the passenger seat 16 (FIG. 1) after separation of the flap 60 at the tear seam 60H by the fully expanded airbag 18. The second portion 60J of the flap 60 is moved forwardly away from the passenger seat after separation of the flap 60 at the tear seam 60H by the fully expanded airbag 18.

Figure 11:
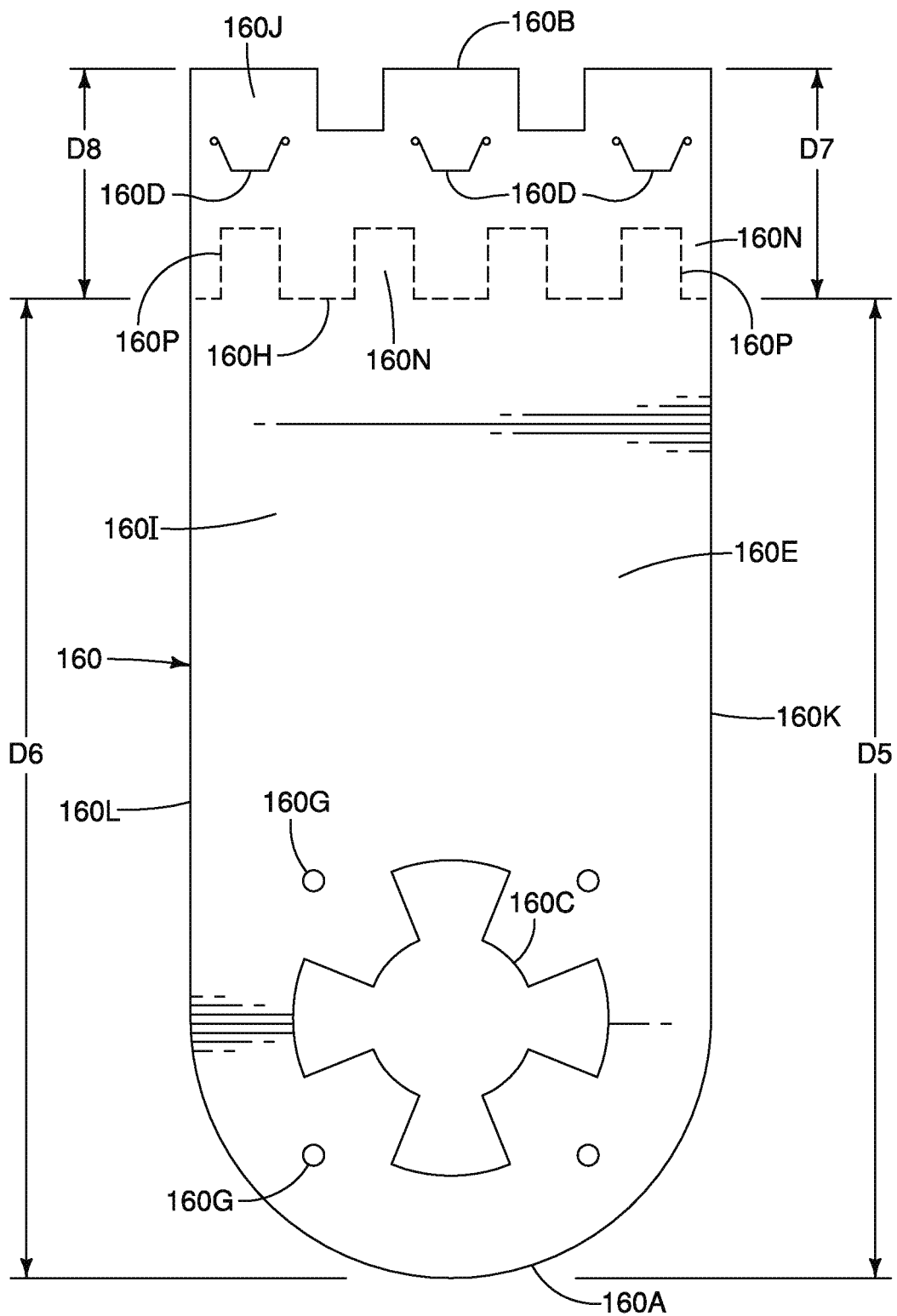
FIG. 11 is a top plan view of a retaining flap of an airbag assembly in accordance with another exemplary embodiment.

As shown in FIG. 11, a retaining flap 160 in accordance with another illustrated exemplary embodiment of the present invention is substantially similar to the retaining flap 60 of the exemplary embodiment illustrated in FIGS. 1-10 except for the differences described below. Similar parts are identified with similar reference numerals, except increased by 100 (i.e., 1xx, accordingly).

The tear seam 160H of the flap 160 is configured differently from the tear seam 60H of the flap 60. The first non-linear portion 160P of the tear seam 160H extends toward the second end 160B of the flap 160. In other words, the first non-linear portions 160P of the tear seam tear seam adjacent the lateral edges 160K and 160L extend towards the second end 160B of the flap 160. In other words, the first rectangular portions 160N are disposed on the second portion 160J of the flap 160.

The tear seam 160H defines the first and second portions 160I and 160J of the flap 160. The plurality of slits, or cuts, 160D are formed in the second portion 160J of the flap 160. The opening 160C configured to receive the inflator 46 (FIGS. 5-8) is disposed in the first portion 160I of the flap 160. The plurality of fastener holes 160G disposed around the opening 160C configured to receive fasteners 62 (FIGS. 6-8) to secure the flap 160 to the housing 44 (FIGS. 6-8) are disposed in the first portion 160I of the flap 160.

A first distance D5 from a first point on the tear seam 160H on the first lateral edge 160K from the first end 160A of the flap 160 is substantially equivalent to a second distance D6 from a second point on the tear seam 160H on the second lateral edge 160L from the first end 160A of the flap 160. A third distance D7 from the first point on the tear seam 160H on the first lateral edge 160K from the second end 160B of the flap 160 is substantially equivalent to a fourth distance 1D4 from the second point on the tear seam 160H on the second lateral edge 160L from the second end 160B of the flap 160. The flap 160 functions substantially similarly to the flap 60 of FIGS. 1-10.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the airbag assembl. Accordingly, these terms, as utilized to describe the present invention should be interpreted relative to a vehicle equipped with the airbag assembly.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An airbag assembly for a vehicle, comprising:
   a housing;
   an airbag stored in the housing; and
   a flap secured to the housing and configured to retain the airbag in a stored state, the flap having a first end and a second end,
   the flap having a tear seam at which the flap is configured to separate upon deployment of the airbag, the tear seam extending non-linearly from a first lateral edge to a second lateral edge,
   the flap including an accordion portion between the first end and the second end of the flap, the tear seam being disposed between the accordion portion and the second end of the flap, the second end of the flap being connected to an outer surface of the housing, and
   the tear seam being disposed along a length of the flap outside a range defined by a first virtual line through a forwardmost bend point of the accordion portion and a second virtual line through a rearmost bend point of the accordion portion when viewed in a lateral direction of the flap, the tear seam being spaced above an uppermost surface of the housing,
   the tear seam is disposed at a first length from the first end of the flap, the first length being a sum of a second length, a third length, and a fourth length, the second length being a distance from the first end of the flap to a wall of the housing, the third length being a distance from the wall of the housing to the uppermost surface of the housing, and the fourth length being a distance from the uppermost surface of the housing to a windshield, a third virtual line corresponding to the third length being substantially perpendicular to a first virtual line corresponding to the second distance, and a fourth virtual line corresponding to the fourth length is substantially perpendicular to the windshield.

2. The airbag assembly according to claim 1, wherein the flap extends across an upper surface of the airbag in the stored state.

3. The airbag assembly according to claim 1, wherein the first end of the flap is connected to an inner surface of the housing.

4. The airbag assembly according to claim 3, wherein a first point on the tear seam on the first lateral edge and a second point on the tear seam on the second lateral edge are substantially a same distance from the first end of the flap.

5. The airbag assembly according to claim 3, wherein an opening is disposed proximate the first end of the flap, the opening being configured to receive an inflator.

6. The airbag assembly according to claim 1, wherein a slit is disposed proximate the second end of the flap.

7. The airbag assembly according to claim 6, wherein a hook is disposed on an outer surface of the housing, the slit being configured to engage the hook to retain the airbag in the housing in the stored state.

8. The airbag assembly according to claim 1, wherein the tear seam forms a first portion of the flap on a first side of the tear seam and a second portion of the flap on a second side of the tear seam, the tear seam forming a plurality of rectangular shapes in the first and second portions of the flap.

9. The airbag assembly according to claim 8, wherein an opening for receiving an inflator is disposed in the first portion of the flap, and
a slit configured to engage a hook disposed on an outer surface of the housing is disposed in the second portion of the flap.

10. The airbag assembly according to claim 9, wherein the accordion portion disposed in the flap is disposed in the first portion of the flap.

11. The airbag assembly according to claim 10, wherein the first portion having a first length and the second portion having a second length, the first length being longer than the second length.

12. The airbag assembly according to claim 10, wherein the first portion of the flap is configured to be disposed nearer to a passenger seat then the second portion of the flap.

13. The airbag assembly according to claim 1, wherein the second end of the flap is disposed externally of a perimeter defined by a plurality of walls of the housing.

14. An airbag assembly for a vehicle, comprising:
   an instrument panel disposed forward of a front passenger seat of the vehicle, a recess being formed in the instrument panel;
   a housing configured to be received in the recess in the instrument panel;
   an inflator connected to the housing;
   an airbag stored in the housing and in communication with the inflator; and
   a flap secured to the housing and configured to retain the airbag in a stored state, the flap having a first end and a second end,
   the flap having a tear seam at which the flap is configured to separate upon deployment of the airbag, the tear seam extending non-linearly from a first lateral edge to a second lateral edge,
   the flap including an accordion portion between the first end and the second end of the flap, the tear seam being disposed between the accordion portion and the second end of the flap, the second end of the flap being connected to an outer surface of the housing, and the tear seam being disposed along a length of the flap outside a range defined by a first virtual line through a forwardmost bend point of the accordion portion and a second virtual line through a rearmost bend point of the accordion portion when viewed in a lateral direction of the flap, the tear seam being spaced above an uppermost surface of the housing, the tear seam is disposed at a first length from the first end of the flap, the first length being a sum of a second length, a third length, and a fourth length, the second length being a distance from the first end of the flap to a wall of the housing, the third length being a distance from the wall of the housing to the uppermost surface of the housing, and the fourth length being a distance from the uppermost surface of the housing to a windshield, a third virtual line corresponding to the third length being substantially perpendicular to a first virtual line corresponding to the second distance, and a fourth virtual line corresponding to the fourth length is substantially perpendicular to the windshield.

15. The airbag assembly according to claim 14, wherein the first end of the flap is connected to an inner surface of the housing, an opening being disposed proximate the first end of the opening and configured to receive the inflator.

16. The airbag assembly according to claim 14, wherein the tear seam forms a first portion of the flap on a first side of the tear seam and a second portion of the flap on a second side of the tear seam, the tear seam forming a plurality of rectangular shapes in the first and second portions of the flap.

17. The airbag assembly according to claim 16, wherein the first portion having a first length and the second portion having a second length, the first length being longer than the second length.

18. The airbag assembly according to claim 16, wherein the first portion of the flap is configured to be disposed nearer to a passenger seat then the second portion of the flap.

* * * * *